US006751547B2

(12) United States Patent
Khosla

(10) Patent No.: US 6,751,547 B2
(45) Date of Patent: Jun. 15, 2004

(54) METHOD AND APPARATUS FOR ESTIMATION OF FORWARD PATH GEOMETRY OF A VEHICLE BASED ON A TWO-CLOTHOID ROAD MODEL

(75) Inventor: Deepak Khosla, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/994,515

(22) Filed: Nov. 26, 2001

(65) Prior Publication Data

US 2003/0100992 A1 May 29, 2003

(51) Int. Cl.$^7$ .............................................. G01C 21/32
(52) U.S. Cl. ........................ 701/200; 701/207; 345/212
(58) Field of Search ................................. 701/200, 201, 701/207, 208, 25, 26; 345/212, 50, 56, 118, 114

(56) References Cited

U.S. PATENT DOCUMENTS

| | | | |
|---|---|---|---|
| 6,371,418 B1 | * | 4/2002 | Oswald et al. ........... 246/415 R |
| 6,438,494 B1 | * | 8/2002 | Yamamoto et al. ............ 702/5 |
| 6,476,780 B2 | * | 11/2002 | Matsunaga ................... 345/56 |
| 2002/0042668 A1 | * | 4/2002 | Shirato et al. ................. 701/1 |

OTHER PUBLICATIONS

E. D. Dickmanns and B. D. Mysliwetz, Recursive 3–D road and relative ego–state recognition, IEEE Transactions on Pattern Analysis and Machine Intelligence, vol. 14, Issue 2, pp. 199–213, 1992.
A. Takahashi and Y. Ninomiya, "Model–based lane recognition", Proceedings of the 1996 IEEE Intelligent Vehicles Symposium, pp. 201–206, 1996.
R. Behringer, "Detection of discontinuities of road curvature change", Proceedings of the IEEE Intelligent Vehicles '95 Symposium, pp. 78–83, 1995.
J. Goldbeck, G. Draeger, B. Huertgen, S. Ernst, and F. Wilms, "Lane following combining vision and DGPS", IEEE International Conference on Intelligent Vehicles, pp. 445–450, 1998.

* cited by examiner

Primary Examiner—William A. Cuchlinski, Jr.
Assistant Examiner—Olga Hernandez
(74) Attorney, Agent, or Firm—Tope-McKay & Asscoiates

(57) ABSTRACT

A method and apparatus for accurate estimation of forward path geometry of a vehicle based on a two-clothoid road model are presented. Road data provided by a camera or a radar system is collected 200 and a full measurement transfer function of the two-clothoid model is computed 202. The near-range and the far-range clothoid coefficients are estimated simultaneously 204; and the forward path of the vehicle is estimated using the data provided by the two-clothoid model 206.

14 Claims, 4 Drawing Sheets

METHOD AND APPARATUS FOR ESTIMATION OF FORWARD PATH GEOMETRY OF A VEHICLE BASED ON A TWO-CLOTHOID ROAD MODEL

TECHNICAL FIELD

The present invention is generally related to forward path geometry estimation, and more specifically to a method and apparatus for accurate estimation of forward path geometry of a vehicle based on a two-clothoid road model.

BACKGROUND OF THE INVENTION

Vehicular land and road detection systems have been the subject of significant research. Applications such as adaptive cruise control, collision avoidance systems, and vehicle guidance systems require knowledge of the geometry of the road to be most effective. It is difficult for a collision avoidance system to accurately characterize a stationary or slower moving object as non-hazardous unless there is some certainty that the stationary object is not in the vehicle's path. Previous approaches to estimation of forward road geometry, model the road in the forward view as either a constant curvature or a linearly varying curvature. These road geometry estimation approaches then fit parameters of these models via a least-squares fitting technique or other mathematical technique. The linearly varying curvature model is usually referred to as a single-clothoid model and is completely described by two coefficients, $c_0$, the local curvature at host vehicle position and $c_1$ the rate of change of curvature with distance. Both the constant curvature and single-clothoid road models do not adequately represent road geometry, especially when there are abrupt changes in curvature in the look-ahead range. Such sharp changes in curvature are common on many roads. This is also seen on many freeways, where a straightaway section transitions to a curved section abruptly and vice-versa. Thus, methods based on these simple models are generally inaccurate in adequately describing forward road geometry.

To overcome the problem of inaccurate road geometry estimation with these simple models, an averaged curvature road model was proposed. This approach works well on roads with low curvature and very smooth curvature changes, but still fails on roads with significant curvature changes or discontinuities in $c_1$. To reduce these errors further, more complex road models were proposed that split the road into multiple clothoid segments. The transition between segments is estimated using ad-hoc methods such as the generalized likelihood ratio test. In this approach, the geometry of the segments is not dynamic and is updated using measurements that fall in the corresponding segment. A dynamic model is required for vehicle dynamics only, as the road model remains spatially fixed, while the vehicle is moving through the road segments. One of the fundamental limitations of this approach is that road geometry estimation accuracy is strongly dependent on reliable detection of transition points between segments making it very sensitive to noise in the measurements. Thus they are often inaccurate in moderate and high noise measurement conditions. In addition, the segmentation process is computationally expensive because the likelihood ratio test has to be performed for each new measurement.

A naïve approach of using a road model based on a higher-order polynomial to solve these problems with previous methods will lead to over-fitting road geometry and a statistically insignificant estimate of the coefficient of this higher order term. This will also make this approach more sensitive to noise. Thus, it would be desirable to develop a model that overcomes the problems associated with previous approaches. Ideally such a model would be simple to implement and would not as computationally intensive or ad-hoc as the previous multi-clothoid models.

SUMMARY OF THE INVENTION

The present invention provides a method and apparatus for accurate estimation of the forward path geometry of a vehicle based on a two-clothoid road model. The primary components of the invention include a data collection element configured to provide collected data to a first processing element. The data collection element could be a camera sensitive to signals in the visible or infrared region or a combination thereof. Alternatively the data collection element might be a radar transceiver used alone or in conjunction with a camera. The first processing element computes a full measurement transfer function of a two-clothoid road model and conveys the full measurement transfer function to a second processing element. In one embodiment the processing elements in this invention are preprogrammed computers. The processing elements could also include application specific integrated circuits, or devices configured to respond to internal or external instructions. The second processing element is configured to utilize the full measurement transfer function to simultaneously estimate the near-range clothoid coefficients and far-range clothoid coefficients, a third processing element then combines the near-range clothoid coefficients and far-range clothoid coefficients to provide a forward path description.

BRIEF DESCRIPTION OF THE DRAWINGS

The objects, features, and advantages of the present invention will be apparent from the following detailed description of the preferred embodiment of the invention with references to the following drawings.

Figure is defined as: an illustration, a diagram, a picture, a drawing

DETAILED DESCRIPTION

Figure 1:
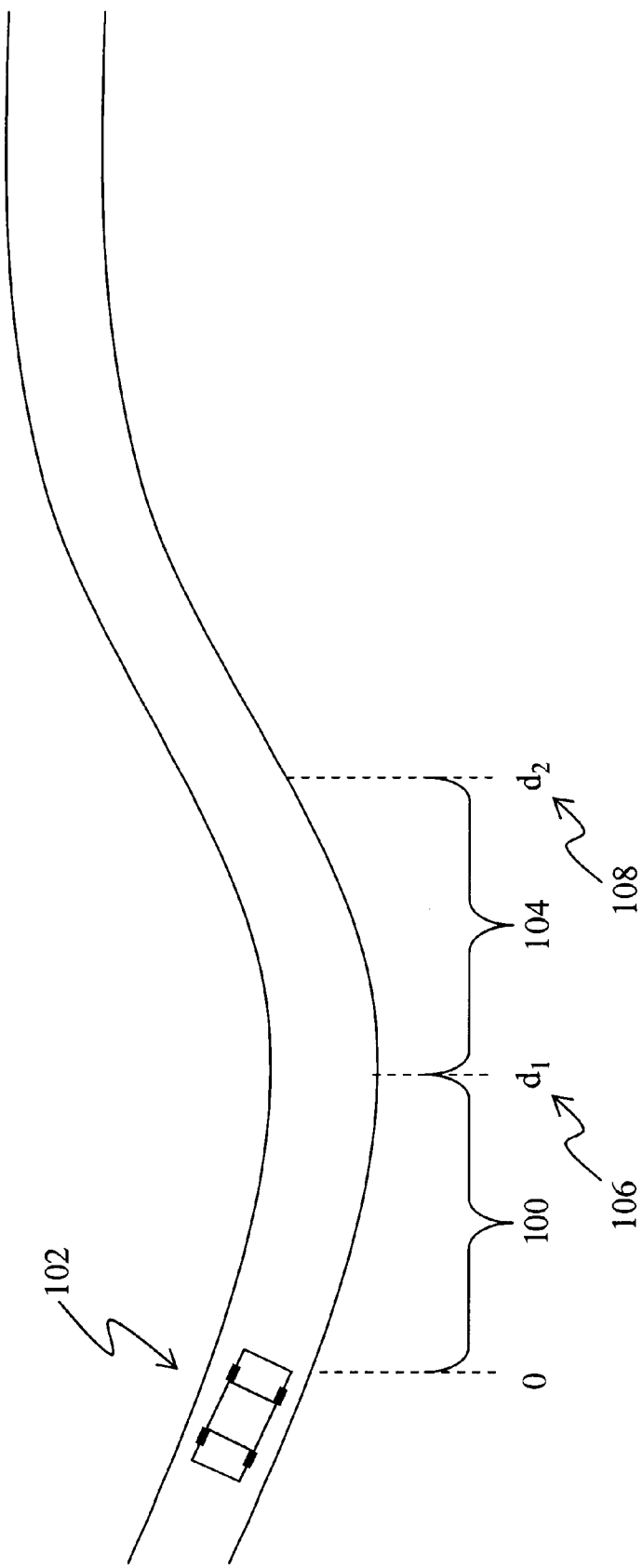
FIG. 1 is an illustration depicting a host vehicle and the near-range and far-range forward path.

The present invention is generally related to forward path geometry estimation and more specifically to a method and apparatus for accurate estimation of forward path geometry of a vehicle, based on a two-clothoid road model. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

The present invention provides a method and apparatus for accurate estimation of forward path geometry of a vehicle. One embodiment of the present invention discloses a road model that describes the forward geometry as two contiguous clothoid segments with different geometries but with a continuous curvature across the transition. This proposed model describes road geometry in front of the host vehicle with a closed-form parametric expression of the same polynomial order as previous models but with higher accuracy. This higher accuracy comes without a concomitant increase in computational cost or increased sensitivity to noise.

A commonly used model of the horizontal course of a road is a clothoid, which is a curve whose curvature changes linearly with distance along the road. With a curvature co, the curvature at a distance x along the curve is given by equation 1:

$$c(x) = c_0 + c_1 x \qquad \text{Eqn. 1}$$

The coefficients $c_0$ and $c_1$ represent the rate of change of curvature with distance and are called the clothoid coefficients. Typical highway geometries are approximated by a set of successive clothoids with different coefficients. For example, two segments of constant curvature, where $c_1=0$, could be joined by a transition section where the curvature changes linearly with distance, where $c_1 \neq 0$. Thus transition between segments can have jumps in the clothoid coefficient $c_1$, even when the curvature c(x) itself is steady across the segment transition. A clothoid can be approximated by a third order polynomial that relates the lateral offset of the curve with longitudinal distance along it when the change in road heading angle over the distance along the curve is small. If x is denoted as longitudinal distance and y as lateral offset within a segment then:

$$y = \frac{c_0 x^2}{2} + \frac{c_1 x^3}{6} \qquad \text{Eqn. 2}$$

Since the road geometry changes as the host vehicle moves along the road, the clothoid coefficients are time varying and dependent on the speed of the vehicle. One approach to estimating model parameters at each time instant is to perform non-recursive least-squares fitting on the data points. The main problem with non-recursive least-squares estimation is that it can be very sensitive to stochastic errors, including sensor errors, resulting in widely oscillating estimates from one time step to the next. It is possible to substantially overcome this problem by utilizing a recursive estimation method. Since vehicle motion relative to the road makes forward road geometry a quantity that varies dynamically with time, it is appropriate to use a dynamic recursive estimation approach such as a Kalman filter. The dynamic recursive estimation approach uses both a model-based update of state variables, clothoid coefficients in this example, and uses updates of the state estimates incorporating a weighted version of new measurements. Recursive filtering can provide more accuracy and improved robustness to stochastic errors, as it acts as a type of "low-pass" filter whereby errors are minimized.

In another embodiment of the present invention, the forward road geometry is modeled as two contiguous single-clothoid segments with different $c_1$ parameters as shown in FIG. 1. The first segment is from $0-d_1$ 100 in front of the host vehicle 102. This is the near-range clothoid segment. The second segment is from $d_1-d_2$ 104 in front of the host vehicle, this is the far-range clothoid segment. Here $d_1$ 106 is the transition point between the segments and $d_2$ 108 is the set range of the sensor system. Since the detection the transition between the segments is difficult and sensitive to noise, $d_1$ 106 is set to a fixed distance in front of the vehicle with a nominal value equal to approximately 50% of the utilized range of the sensor system. One example of an embodiment is where $d_1$ 106=50 m for a $d_2$ 108=100 m. If the actual transition point is closer, then near-range segment estimation errors will be similar to a single-clothoid model based method albeit for a much shorter range from host vehicle to end of near-range segment. Similarly, if actual transition is beyond this nominal value, far-range segment estimation errors will be similar to a single-clothoid model based method, albeit for a much shorter range from the start to the end of far-range segment. Thus, choosing a mid-range distance as the transition point offers the best compromise when the actual transition point deviates from the fixed chosen value. However, the transition point between the clothoid segments can be selected as a variable in the state space representation of the Kalman filter, but the transition point is set to a nominal value for practical reasons.

Figure 2:
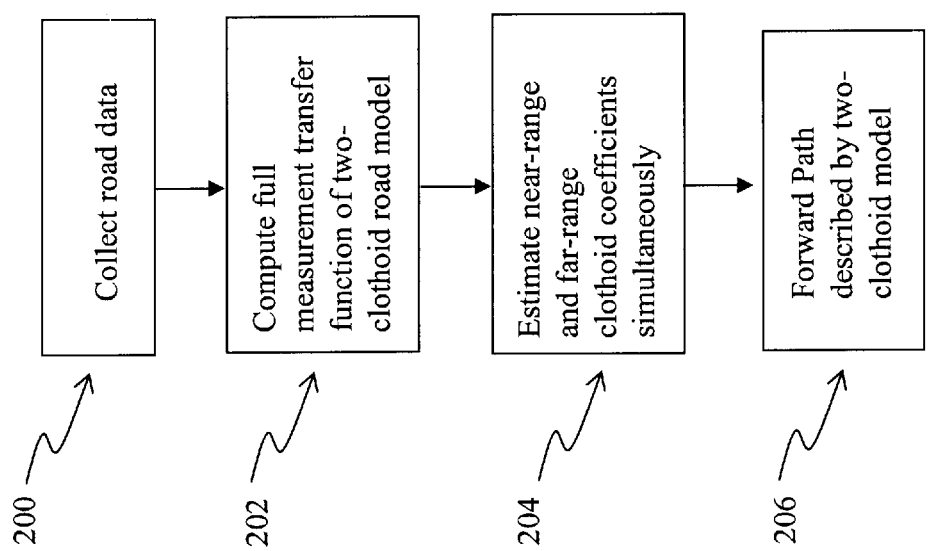
FIG. 2 is a block diagram flowchart showing the operation of the principle embodiment.

A block diagram flowchart showing the operation of the principle embodiment of the present invention is shown in FIG. 2. According to this flowchart, an apparatus is presented, wherein the apparatus is configured to estimate the forward path of a vehicle. Accordingly a data collection element collects road data 200. This data collection element could include a video camera affixed to a vehicle, a radar transceiver affixed to a vehicle, an image capture device affixed to a vehicle and substantially responsive to electromagnetic radiation in the visible region, the infrared region, or a combination of the infrared and visible regions. The data collection element is configured to collect data and to provide the collected data to a first processing element, wherein the first processing element 204 computes a full measurement transfer function of a two-clothoid road model 202. The first processing element then conveys the full measurement transfer function to a second processing element which is configured to utilize the full measurement transfer function to simultaneously estimate the near-range clothoid coefficients and far-range clothoid coefficients and provide the near-range clothoid coefficients and far-range clothoid coefficients to a third processing element. The third processing element combines the near-range clothoid coefficients and far-range clothoid coefficients to provide a forward path description 206. The processing elements could be any number of different devices that are configured to perform the necessary computations. For example, a computer configured to perform pre-specified functions could be utilized, or a device configured to respond to operator instructions, or a device configured to respond to external instructions, a device configured to respond to internal system instructions, an application-specific integrated circuit, or a preprogrammed logic circuit. Additionally, a combination of the foregoing could be used.

The present invention provides a method for estimating the forward path of a vehicle comprising the steps shown in FIG. 2. According to this diagram, a method is presented, wherein the method provides a sequence of steps, which in the aggregate estimate the forward path of a vehicle. According to this method there is a data collection step where road data is collected 200 utilizing a data collection element. The data collection element could include a video camera affixed to a vehicle, a radar transceiver affixed to a vehicle, an image capture device affixed to a vehicle and substantially responsive to electromagnetic radiation in the visible region, the infrared region, or a combination of the infrared and visible regions. The data collection element is configured to collect data and to provide the collected data to a first processing element, wherein the first processing element computes a full measurement transfer function of a two-clothoid road model 202. The first processing element then conveys the full measurement transfer function to a second processing element which is configured to utilize the full measurement transfer function to simultaneously estimate the near-range clothoid coefficients and far-range clothoid coefficients and provide the near-range clothoid coefficients and far-range clothoid coefficients to a third processing element 204. The third processing element combines the near-range clothoid coefficients and far-range clothoid coefficients to provide a forward path description 206. The processing elements could be any number of different devices that are configured perform the necessary computations. For example, a computer configured to perform pre-specified functions could be utilized, or a device configured to respond to operator instructions, or a device configured to respond to external instructions, a device configured to respond to internal system instructions, an application-specific integrated circuit, or a preprogrammed logic circuit. Additionally, a combination of the foregoing could be used.

The curvature of the road at the host vehicle is defined to be $c_0$. The rate of change of curvature in the near and far range segments are defined as $c_1$ and $c_2$, respectively. For small angle approximations, the lateral offset y of the road edge as a function of look-ahead distance x can be expressed as:

$$y = c_0 \frac{x^2}{2} + c_1 \frac{x^3}{6}, \; 0 < x \le d_1$$
$$y = c_0 \frac{x^2}{2} + c_1 \left( \frac{d_1^3}{6} + \frac{x(x-d_1)d_1}{2} \right) + c_2 \frac{(x-d_1)^3}{6},$$
$$d_1 < x \le d_2$$

Eqn. 3

The above equation is derived by matching the lateral offset, heading angle, and curvature at the end of the near-range segment and start of the far-range segment as shown below.

At the transition point, or the end of the near range segment ($x=d_1$)

Curvature at transition point: $c_T = c_0 + c_1 d_1$

Heading angle at transition point:

$$\eta_T = c_0 d_1 + \frac{1}{2} c_1 d_1^2$$

Lateral offset at transition point:

$$y_T = \frac{1}{2} c_0 d_1^2 + \frac{1}{6} c_1 d_1^3$$

In far-range segment ($d_1 < x \le d_2$):

Lateral offset of point P in coordinate system X'Y':

$$y'_P = \frac{1}{2} c_T (x - d_1)^2 + \frac{1}{6} c_2 (x - d_1)^3$$

Lateral offset of point P in coordinate system XY: $y_P = y_T + y'_P \cos \eta_T + (x - d_1) \sin \eta_T$ Using small angle approximation: $y_P = y_T + y'_P + (x - d_1) \eta_T$ Substituting for $y'_P$, $c_T$, $\eta_T$ and $y_T$ gives Eqn. (3), above.

The estimation apparatus and method proposed here are based on the above two-clothoid road model and relies on a dynamic recursive estimation approach. A major difference between the invented apparatus and method and conventional single-clothoid based systems lies in the new process dynamics model, which accounts for the additional coefficient $c_2$ and the new measurement transfer function.

As the vehicle drives through the clothoid with speed v, the coefficients describing the curvature model of the clothoid change according to the motion of the vehicle. For a road with jumps in curvature rate in the look-ahead range, the time derivative of this rate of change at the transition is an impulse. However, since these transitions cannot be reliably determined in noisy measurements, the time derivative of $c_1$ and the time derivative $c_2$ are both approximated by white noise. This leads to the following dynamical model of the road in the horizontal plane:

$$\begin{bmatrix} \dot{c}_0 \\ \dot{c}_1 \\ \dot{c}_2 \end{bmatrix} = \begin{bmatrix} 0 & v(t) & 0 \\ 0 & 0 & 0 \\ 0 & 0 & 0 \end{bmatrix} \begin{bmatrix} c_0 \\ c_1 \\ c_2 \end{bmatrix} + \begin{bmatrix} 0 \\ w_1(t) \\ w_2(t) \end{bmatrix},$$

where, v(t) is vehicle speed;
$w_1(t)$ is the continuous driving white noise term for $c_1$; and
$w_2(t)$ is the continuous driving white noise term for $c_2$.

The vertical curvature in the above model has been ignored, but can be easily appended to the above state-space representation. Consider a sample time interval T, the predicted state vector estimate at time k+1 using the estimate at time k is given by:

$$X_{k+1} = \Phi_k X_k + W_k;$$

$$X_k = \text{state vector} = \begin{bmatrix} c_{0,k+1} \\ c_{1,k+1} \\ c_{2,k+1} \end{bmatrix}$$

$$\Phi_k = \text{State transition matrix} = \begin{bmatrix} 1 & v(k)T & 0 \\ 0 & 1 & 0 \\ 0 & 0 & 1 \end{bmatrix}$$

$$W_k = \text{Process noise vector} = \begin{bmatrix} v(k)Tw_1(k) \\ w_1(k) \\ w_2(k) \end{bmatrix}$$

where $w_1(k)$ and $w_2(k)$ are scalar, zero-mean, white-noise sequences with variances $\sigma_1^2$ and $\sigma_2^2$, respectively.

The process noise covariance Q(k) is thus defined as:

$$Q(k) = \begin{bmatrix} (v(k)T)^2\sigma_1^2 & v(k)T\sigma_1^2 & 0 \\ v(k)T\sigma_1 & \sigma_1^2 & 0 \\ 0 & 0 & \sigma_2^2 \end{bmatrix}$$

The measurement vector $Y_k$ comprises noisy lateral offsets of a number of road points available from some sensor system onboard the host vehicle (vision-based, GPS, etc.). The measurements are available for N road points: n points with lateral offsets $y_1, y_2, \ldots, y_n$ at distances $x_1, x_2, \ldots, x_n$, respectively, in the near-range segment, and f points with lateral offsets $y_{n+1}, y_{n+2}, \ldots, y_{n+f}$ at distances $x_{n+1}, x_{n+2}, \ldots, x_{n+f}$, respectively, in the far-range segment (N=n+f). Using Equation (3), the measurement equation in a matrix notation can be denoted as:

$Y_k = H_k X_k + N_k$, $$Y_k = \text{Measurement vector} = \begin{bmatrix} y_1 \\ y_2 \\ \vdots \\ y_N \end{bmatrix},$$

$$H_k = \frac{\text{Measurement}}{\text{transfer function}} =$$

$$\begin{bmatrix} \frac{1}{2}x_1^2 & \frac{1}{6}x_1^3 & 0 \\ \frac{1}{2}x_2^2 & \frac{1}{6}x_2^3 & 0 \\ \vdots & \vdots & \vdots \\ \frac{1}{2}x_n^2 & \frac{1}{6}x_n^3 & 0 \\ \frac{1}{2}x_{n+1}^2 & \frac{1}{6}d_1^3 + \frac{1}{2}(x_{n+1}-d_1)(x_{n+1})d_1 & \frac{1}{6}(x_{n+1}-d_1)^3 \\ \frac{1}{2}x_{n+1}^2 & \frac{1}{6}d_1^3 + \frac{1}{2}(x_{n+2}-d_1)(x_{n+2})d_1 & \frac{1}{6}(x_{n+2}-d_1)^3 \\ \frac{1}{2}x_{n+f}^2 & \frac{1}{6}d_1^3 + \frac{1}{2}(x_{n+f}-d_1)(x_{n+f})d_1 & \frac{1}{6}(x_{n+f}-d_1)^3 \end{bmatrix}$$

$$N_k = \text{Measurement noise vector} = \begin{bmatrix} n_1 \\ n_2 \\ \vdots \\ n_N \end{bmatrix},$$

The estimation approach set forth above, uses the above process and measurement model equations to recursively estimate the road model parameters. In this example a Kalman filter is used.

Figures 3A, 3B:
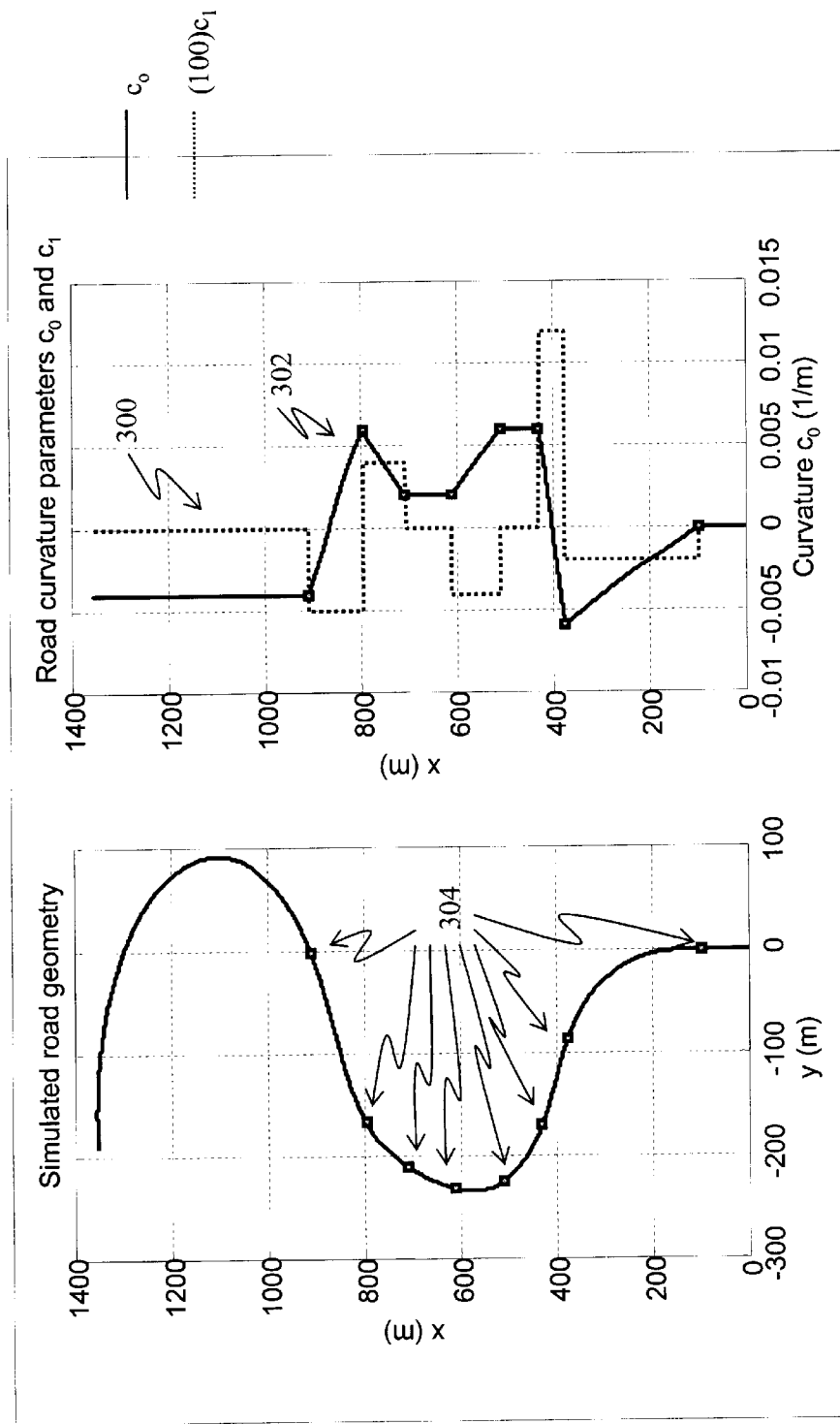
FIG. 3a is a diagram of the geometry of a road.
FIG. 3b is a depiction of the of the corresponding road curvature parameters.

In FIGS. 3a and 3b, a simulated segment of road is introduced. The road segment has several different geometry segments with sharp discontinuities in the $c_1$ coefficient 300. The road segment is based on a clothoid model with continuous curvature across the clothoid transitions. This geometry is typical of many freeways. The simulated road geometry is shown in FIG. 3a, while the road curvature parameters $c_0$ 302 and $c_1$ 300 are shown in FIG. 3b. The actual transition points 304 are also shown in FIG. 3a. A host vehicle in this example traverses the road with a speed of 20 m/sec with a look-ahead distance of 100 m. Road geometry information is provided as offsets of 8 points along the road spaced 10 m apart starting in front of the host vehicle. For this example, the sampling rate was selected as 10 Hz, however a wide variety of other sampling rates are quite satisfactory. Kalman filter estimation methods, based on the two-clothoid road model, were used for the depictions set forth in FIG. 3a and FIG. 3b. The invention uses offsets of road points as measurements, and estimates corresponding model parameters. Further the two-clothoid model uses a fixed transition point at 50 m in front of the vehicle.

Figure 4A:
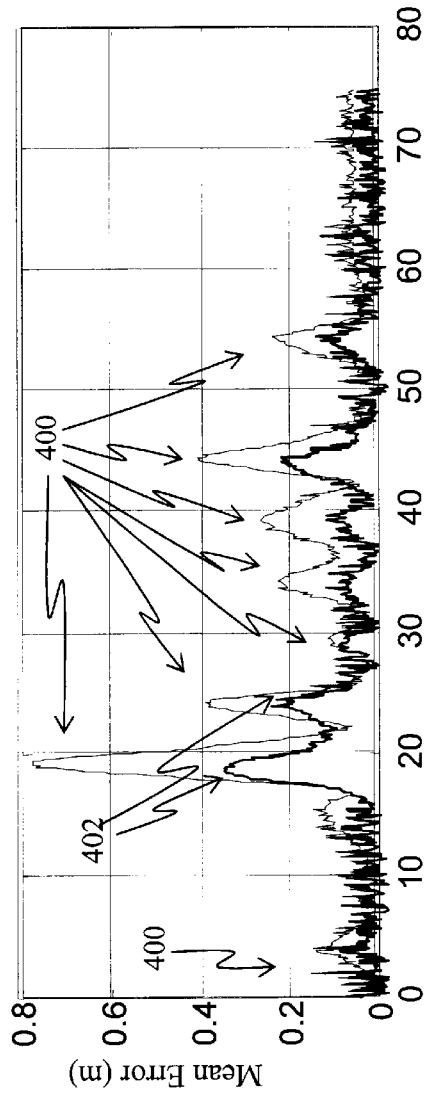
FIG. 4a is a comparison of the mean error between the single-clothoid road model and the two-clothoid road model.
Figure 4B:
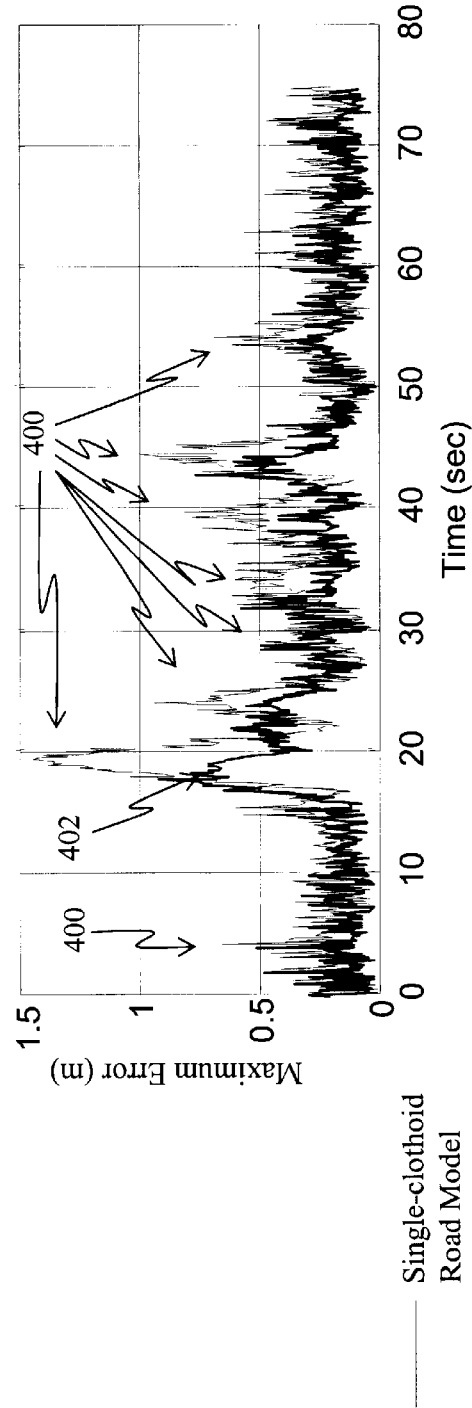
FIG. 4b is a comparison of the maximum error between the single-clothoid road model and the two-clothoid road model.

The estimated road geometry is compared to the road geometry and errors are computed. The mean estimation errors for both the single and two-clothoid models are shown in FIG. 4a. The maximum estimation errors for a single clothoid and a two-clothoid model are shown in FIG. 4b. The peaks 400 in the error plots correspond to the transition points 304. The absence of peaks, or presence of smaller peaks 402, reflects the improvement achieved with the two-clothoid road model, according to the present invention. For the purposes of clarity not every small peak 402 is illustrated. The present invention provides for smaller road geometry estimation errors, especially at and near transitions in road geometry 400.

What is claimed is:

1. An apparatus for estimating the forward path of a vehicle comprising a data collection element and a data processor, wherein the data collection element is configured to collect data and to provide the collected data to the data processor, and wherein the data processor computes a full measurement transfer function of a two-clothoid road model and utilizes the full measurement transfer function to simultaneously estimate near-range clothoid coefficients and far-range clothoid coefficients and combines near-range clothoid coefficients and far-range clothoid coefficients to provide a forward path description.

2. An apparatus as set forth in claim 1, wherein the data processor includes elements from the group comprising:
   a. a computer configured to perform pre-specified functions;
   b. a device configured to respond to operator instructions;
   c. a device configured to respond to external instructions;
   d. a device configured to respond to internal system instructions;
   e. an application-specific integrated circuit; and
   f. a preprogrammed logic circuit.

3. An apparatus as set forth in claim 1, wherein the data collection element provides data related to the horizontal features of the road including at least one of the following:
   a. the curvature of the road;
   b. the width of the lane; and
   c. the rate of change of curvature of the road.

4. An apparatus as set forth in claim 1, wherein the data collection element includes at least one of the following:
   a. a video camera affixed to a vehicle;
   b. a radar transceiver affixed to a vehicle; or
   c. a image capture device affixed to a vehicle and substantially responsive to electromagnetic radiation in at least one of the following regions:
      i. the visible region;
      ii. the infrared region; and
      iii. the infrared and visible regions.

5. An apparatus as set forth in claim 1, wherein the data processor combines the estimate of near-range forward path and the estimate of the far-range forward path using a dynamic recursive estimation algorithm.

6. An apparatus as set forth in claim 1, wherein the data processor combines the estimate of near-range forward path and the estimate of the far-range forward path using a Kalman filtering estimation.

7. An apparatus as set forth in claim 1, wherein the length of the near-range forward path and the length of the far-range forward path are approximately equal.

8. A method for estimating the forward path of a vehicle comprising steps of:
   i. collecting data from a data collection element;
   ii. providing the collected data to the data processor;
   iii. computing, in the data processor, a full measurement transfer function of a two-clothoid road model;
   iv. utilizing the full measurement transfer function to simultaneously estimate near-range clothoid coefficients and far-range clothoid coefficients; and
   v. combining the near-range clothoid coefficients and far-range clothoid coefficients to provide a forward path description.

9. A method for estimating the forward path of a vehicle as set forth in claim 8, with the additional step of:
   providing a data processor, wherein the provided data processor includes at least one element from the group comprising:
      a. a computer configured to perform pre-specified functions;
      b. a device configured to respond to operator instructions;
      c. a device configured to respond to external instructions;
      d. a device configured to respond to internal system instructions;
      e. an application-specific integrated circuit; and
      f. a preprogrammed logic circuit.

10. A method for estimating the forward path of a vehicle as set forth in claim 8, with the additional step of:
   providing a data collection element, wherein the provided data collection element provides data related to the horizontal features of the road including at least one of the following:
      a. the curvature of the road;
      b. the width of the lane; and
      c. the rate of change of curvature of the road.

11. A method for estimating the forward path of a vehicle as set forth in claim 10, with the additional step of utilizing at least one of the following data collection elements as a means for collecting data: a video camera, a radar transceiver, and an image capture device substantially responsive to electromagnetic radiation in at least one of the following regions:
   i. the visible region;
   ii. the infrared region; and
   iii. the infrared and visible regions.

12. A method for estimating the forward path of a vehicle as set forth in claim 8, with the additional step of combining the estimate of near-range forward path and the estimate of the far-range forward path using a dynamic recursive estimation algorithm.

13. A method for estimating the forward path of a vehicle as set forth in claim 8, with the additional step of combining the estimate of near-range forward path and the estimate of the far-range forward path utilizing a Kalman filter.

14. A method for estimating the forward path of a vehicle as set forth in claim 8, with the additional step of providing that the length of the near-range forward path and the length of the far-range forward path are approximately equal.

* * * * *

UNITED STATES PATENT AND TRADEMARK OFFICE
CERTIFICATE OF CORRECTION

PATENT NO. : 6,751,547 B2
APPLICATION NO. : 09/994515
DATED : June 15, 2004
INVENTOR(S) : Deepak Khosla Page 1 of 1

It is certified that error appears in the above-identified patent and that said Letters Patent is hereby corrected as shown below:

At column 3, line 23, "co" should read --$c_o$--.

At column 6, line 58, "transitio n" should read --transition-- (no space between the "o" and the "n").

Signed and Sealed this

Twenty-fifth Day of March, 2008

JON W. DUDAS
*Director of the United States Patent and Trademark Office*